No. 729,099. PATENTED MAY 26, 1903.
J. K. SMITH.
MANUFACTURE OF PIPES.
APPLICATION FILED MAY 22, 1901.
NO MODEL. 3 SHEETS—SHEET 1.
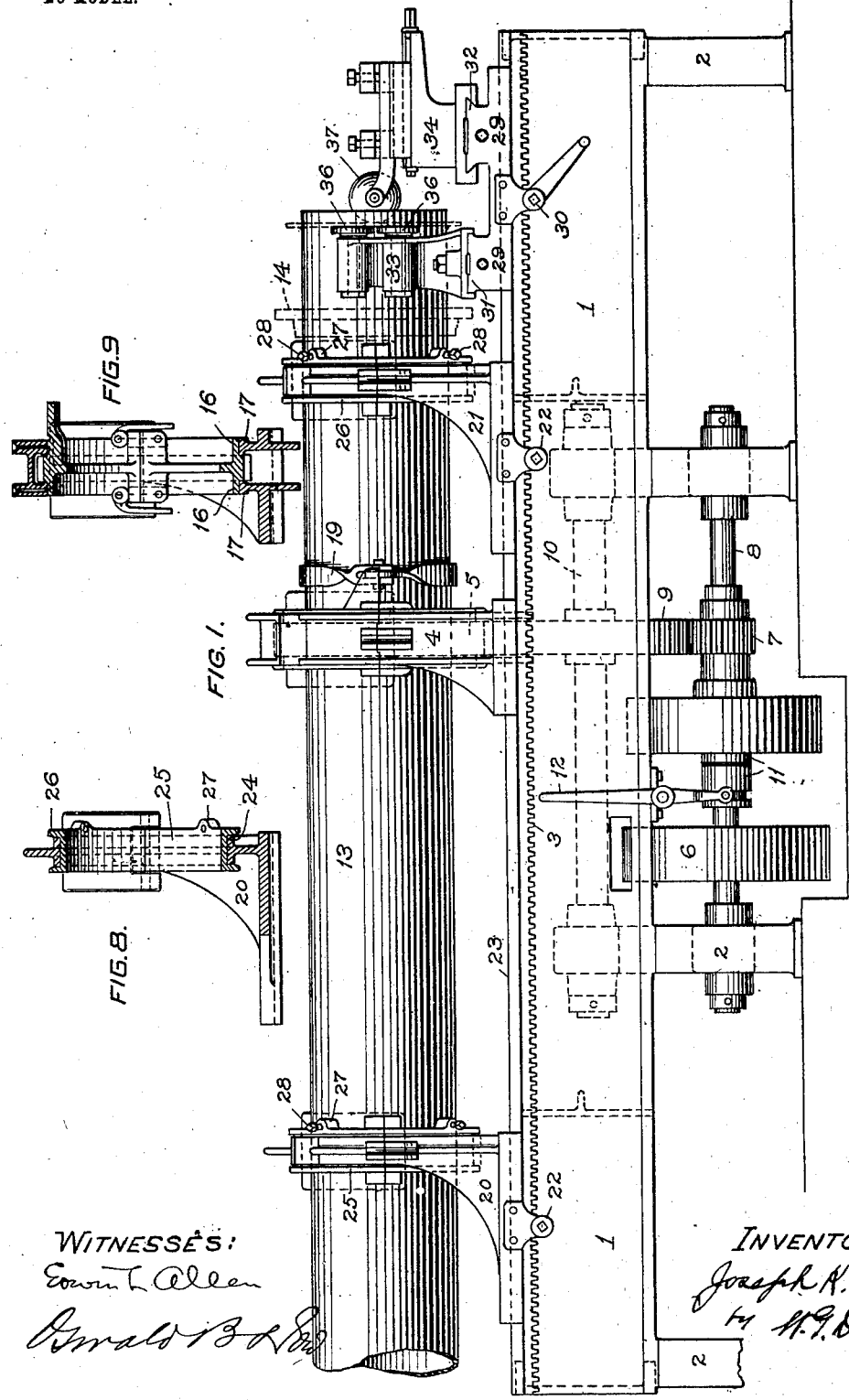
WITNESSES:
INVENTOR;
Joseph K. Smith
by H. G. Doolittle
ATT'Y.

No. 729,099. PATENTED MAY 26, 1903.
J. K. SMITH.
MANUFACTURE OF PIPES.
APPLICATION FILED MAY 22, 1901.
NO MODEL. 3 SHEETS—SHEET 2.
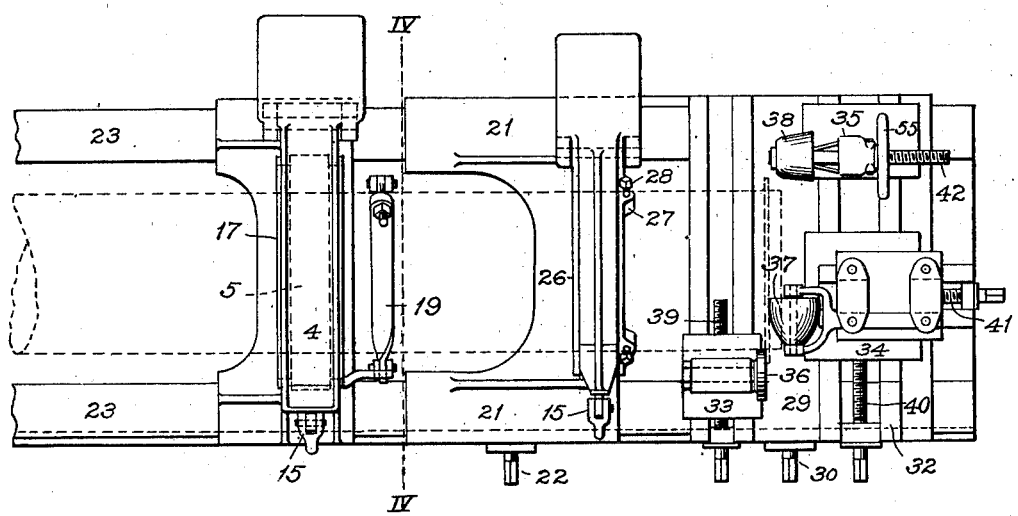
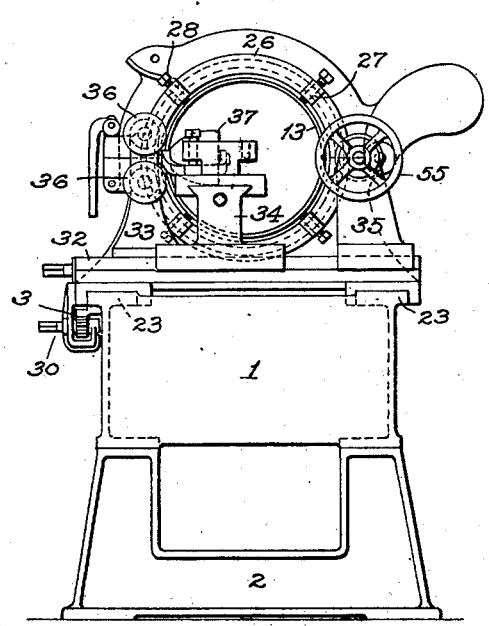
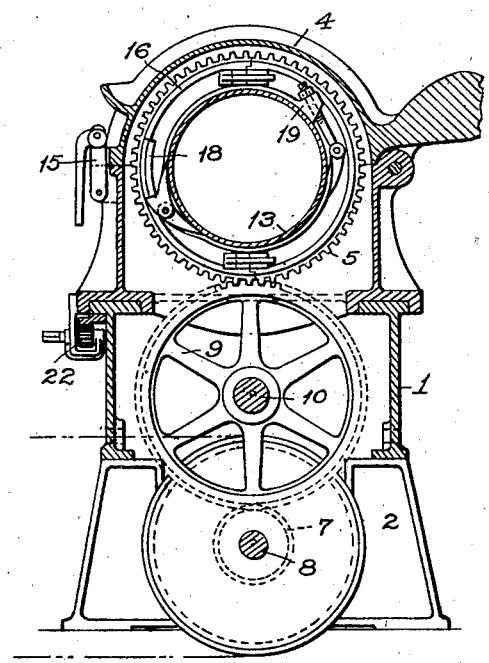

No. 729,099.

Patented May 26, 1903.

UNITED STATES PATENT OFFICE.

JOSEPH K. SMITH, OF PITTSBURG, PENNSYLVANIA.

MANUFACTURE OF PIPES.

SPECIFICATION forming part of Letters Patent No. 729,099, dated May 26, 1903.

Application filed May 22, 1901. Serial No. 61,405. (No model.)

*To all whom it may concern:*

Be it known that I, JOSEPH K. SMITH, a citizen of the United States, residing at Pittsburg, in the county of Allegheny and State of Pennsylvania, have invented certain new and useful Improvements in the Manufacture of Pipes; and I do hereby declare the following to be a full, clear, and exact description of the invention, such as will enable others skilled in the art to which it appertains to make and use the same.

My invention relates to the manufacture of pipes, and more particularly to that class of pipes having a bearing-surface formed on one or both ends and a flange or collar attached thereto. To this end my invention consists of new and improved means for making such pipes and in the construction and combination of parts, all as fully hereinafter described and claimed.

The object of my invention is to provide mechanical means for performing the work heretofore done by manual labor and to expedite the work and lessen the cost of manufacture.

In making wrought-iron pipes it has been customary to form screw-threads on their ends for the purpose of engaging internally-screw-threaded flanges or collars employed in joining the ends of the pipes, or another and preferable construction is to form a flanged meeting or bearing surface on the ends and expand a portion of the pipe for the purpose of entering a groove in the movable flange or collar. The work on this latter form, which is coming into very extensive use, has prior to my invention been performed by hand in a slow, expensive, and unsatisfactory manner. The importance of doing this work by means of a machine will be readily appreciated by those skilled in the art.

Figure 5:
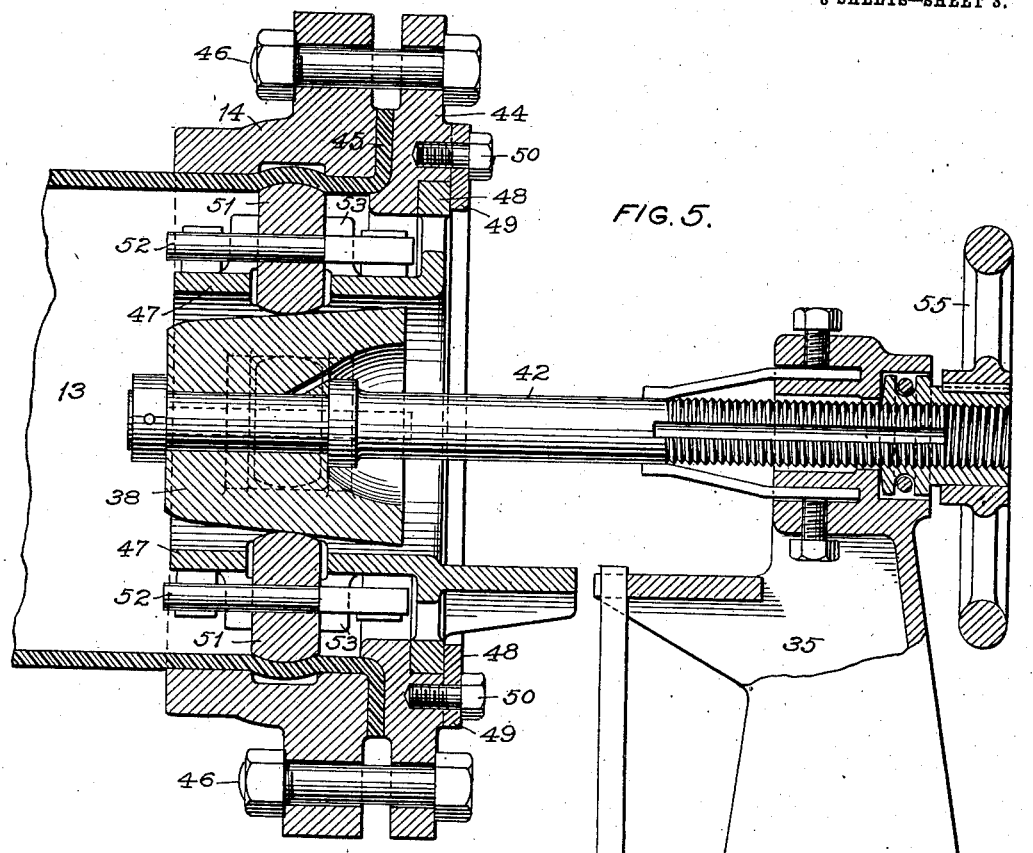

In the accompanying drawings, which illustrate an application of my invention, Figure 1 is a side elevational view of a machine embodying my invention and showing a pipe in position on the machine; Fig. 2, a top plan; Fig. 3, an end elevational view; Fig. 4, a vertical sectional view taken on line IV IV of Fig. 2; Fig. 5, a central vertical sectional view showing the expanding device and plug in position within the pipe, and Fig. 6 an end view of part of the expander; Fig. 7, a central vertical sectional view of a part of a pipe, showing the bearing-surface or flange formed on the end and the collar or flange attached thereto; Fig. 8, a part-sectional view and a part-elevational view of a collar and its bearing, and Fig. 9 a similar view of a gear-wheel and casing.

Referring to the drawings, a bed 1, preferably of the form shown, is supported on a suitable stand 2, and for the purpose of engaging with pinions, as will be hereinafter described, is provided along one side with a row of teeth 3.

Mounted in a gear-casing 4 is a gear-wheel 5. This gear-wheel is preferably driven in the manner shown by the drawings, the means in this instance comprising a wheel 6, driven by a belt, (not shown,) a small gear 7, carried on shaft 8, and gear-wheel 9, located between gear-wheels 5 and 7 and mounted on a shaft 10. Between the small gear-wheel 7 and the pulley-wheel 6 I have shown a friction-clutch mechanism 11, operated by a lever 12.

For the purpose of readily placing the pipe 13 in position upon the machine and removing it therefrom after the flange or collar 14 has been attached thereto I form the gear-casing 4, as well as the gear-wheel 5, in two parts. The upper part of the casing is joined to the lower part in the manner particularly shown by Fig. 4 and may be easily raised from the lower and stationary part when inserting and removing a pipe. The two parts are securely held together by a locking device 15. Each part of gear-wheel 5 is provided with outwardly-extending bearing-surfaces 16, adapted to rest upon annular bearings 17, formed in the gear-casing. Attention is called to Fig. 9, which shows the construction just described. Gear-wheel 5 is also provided with an outwardly-extending engaging part or lug 18, this part being adapted to engage with a dog 19, encircling the pipe, as particularly shown by Fig. 4.

Carriers 20 and 21, provided with pinions 22, rest upon two longitudinally-disposed plates 23 of the bed and are adapted to be moved thereon by turning the pinions 22, which engage with the teeth 3. Annular bearings 24 are formed on these carriers for collars 25 and 26. Each of these collars is provided with lugs 27, adapted to receive centering-screws 28 and are preferably formed in two parts, as the gear-wheel, and for the same reason. The annular bearings are also formed in two parts and when the pipe is in position on the machine are locked together by suitable means. (Clearly shown by Fig. 3.) The centering-screws 28 are designed to bear against the pipe and when bearing upon the pipe with sufficient pressure will cause the collars 25 and 26 to revolve with the pipe.

Near the forward end of the bed-plate and also mounted on the plates 23 is another carrier 29, having a pinion 30, adapted to engage with the teeth 3. This carrier 29 is provided with bearing parts 31 and 32, on which are mounted the supports 33, 34, and 35 for the rollers or rolls 36, roller or roll 37, and plug 38, respectively. The two supports 34 and 35 are mounted on the bearing 32 and the support for rollers 36 on the bearing 31. These supports are moved laterally on their bearings by means of threaded stems 39 and 40. Both the roller 37 and the plug 38 are mounted on their supports 34 and 35 in such a manner as to have an independent longitudinal movement thereon and be brought into operative position relatively to the end of the pipe. This longitudinal movement is effected by the employment of the screw-threaded stems 41 and 42 and the parts arranged as particularly shown by Figs. 2 and 5.

Figure 6:
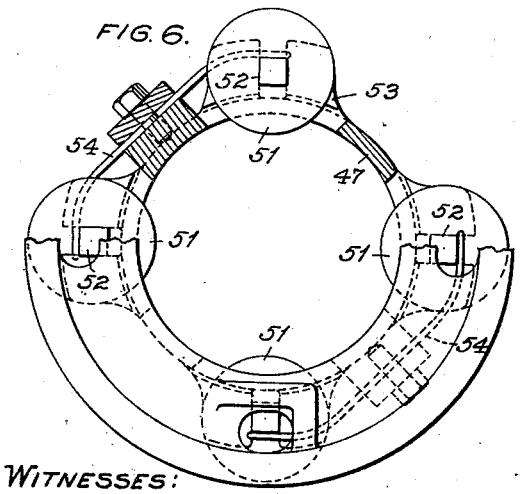
Figure 7:
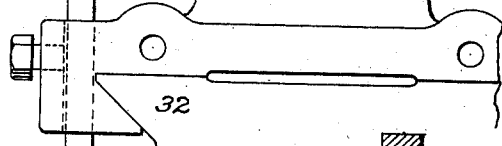

In Figs. 5 and 6 I have shown enlarged views of the means for and manner of expanding or enlarging a portion of the pipe, so that the enlarged portion will enter a groove in the collar or flange 14. As illustrated, these means comprise a ring 44, which when in position is in contact with the flanged end 45 of the pipe and is held tightly against the end 45 by means of the bolts 46, which pass through holes in the ring 44 and the collar or flange 14, also a hollow cylindrical casing 47, having an annular flange 48, which latter has its bearings on the ring 44 and is held in place thereon by collar 49, said collar in turn being attached to ring 44 by bolts 50. This hollow casing carries rollers 51, respectively mounted on shafts 52, which are held in position in slots formed in lugs 53. Springs 54 bear against these shafts, and, as will be noted by reference to Figs. 5 and 6, the shafts and their rollers are adapted to be moved toward and away from the center of casing 47. Plug 38, carried on the end of stem 42, is moved into and out of the casing 47 by turning hand-wheel 55.

It will be noted that when the plug 38 is placed in position within the casing 47 in contact with rollers 51 and the pipe revolved the casing will also revolve in the same direction as the pipe, but at less speed. This construction permits the rollers 51 to travel around with the pipe while rotating on their shafts and to better perform the operation of forcing the metal of the pipe into the groove of the collar or flange 14 than would be the case if the casing 47 did not revolve.

In practice a pipe upon which the flanged bearing end is to be formed and to which the flange or collar is to be attached is first placed on the machine and properly set thereon by means of the set-screws. After this is accomplished the gear-wheel is stopped, the dog disengaged therefrom, and the pipe removed from the machine for the purposes of heating an end. When the end is sufficiently heated, the pipe is again placed on the machine within the collars and gear, as shown by Fig. 1, and the dog placed around the pipe and connected to the engaging lug of the gear. The rollers or rolls 36 and the roller or roll 37, having been brought to operative positions, the machine is started and the pipe caused to revolve. The pressure of the rolls 36 and roll 37 upon the end of the pipe is controlled by an attendant and may be readily regulated by the means shown and described. After the flanged bearing-surface 45 is formed on the pipe the machine is stopped to permit the flange or collar 14 to be brought up into position against the flanged end of the pipe and also to allow the means for expanding a portion of the pipe to be placed in position.

The flange or collar and the expanding means being in position and the rollers or rolls for forming the flanged end being moved out of contact with the pipe, the machine is again started and a portion of the pipe readily expanded into the groove of the flange 14.

Having thus described my invention, what I claim is—

1. In a machine adapted for the manufacture of wrought-iron pipes, the combination, with a suitable frame, of means for supporting and revolving a pipe, means for forming a bearing-surface or flange on an end of the pipe comprising a carrier, a roll mounted on a laterally-adjustable support thereon located at the rear of the end of the pipe to be flanged, a longitudinally and laterally adjustable roll on the carrier located in front of said end, means for independently moving one of said rolls both longitudinally and laterally on said carrier and the other roll laterally thereon relatively to the axis of the pipe, substantially as set forth.

2. In a machine adapted for the manufacture of wrought-iron pipes, the combination, with a suitable frame, of means for supporting and revolving a pipe, means for forming a bearing-surface or flange on an end of the pipe comprising a longitudinally-adjustable carrier on said frame having a laterally-adjustable roll thereon located at the rear of the end of the pipe, means for moving said roll relatively to the axis of the pipe, and a roll on said carrier laterally and longitudinally adjustable of the machine located in front of the end of the pipe, and means for moving said roll relatively to the axis of the same, substantially as described.

3. In a machine adapted for the manufacture of wrought-iron pipes, the combination, with a suitable frame, of means for supporting and revolving a pipe, means for forming a bearing-surface or flange on the end of the pipe comprising, a roll located at the rear of the end of the pipe, a roll in front of the end of the pipe, a movable carrier on which both of the rolls are mounted, means for independently moving one of said rolls laterally and the other roll laterally and longitudinally on the carrier to bring the rolls into operative positions relatively to the end of the pipe, substantially as set forth.

4. In a machine for the manufacture of pipes, the combination, with a suitable frame, of means for revolving a pipe comprising, a sectional gear-casing, a sectional gear-wheel in said casing, a dog surrounding the pipe to be operated on engaging with the gear-wheel, a driving mechanism for the gear-wheel, and means for forming a flat bearing-surface or flange on the end of the revolving pipe, substantially as set forth.

5. In a machine for the manufacture of pipes, the combination with a suitable frame, of means for revolving a pipe comprising, a sectional gear-casing, a sectional gear-wheel mounted therein, means on the pipe engaging with the sectional gear-wheel, driving mechanism for the gear-wheel, sectional collars longitudinally adjustable relatively to the axis of the pipe adapted to receive the pipe to be operated on, and means for forming a flat bearing-surface or flange on the end of the revolving pipe, substantially as set forth.

6. In a machine adapted for the manufacture of wrought-iron pipes, the combination with a suitable frame, of means for supporting and revolving a pipe, means for forming a bearing-surface or flange on the end of the pipe comprising a carrier longitudinally adjustable on said frame, said carrier having adjustable supports thereon, a roll mounted on one of said supports and longitudinally adjustable thereon relatively to the axis of the pipe, and a roll mounted on the other support adapted to be adjusted laterally thereon relatively to the axis of the pipe, substantially as described.

7. In a machine adapted for the manufacture of wrought-iron pipes, the combination with a suitable frame, of means for supporting and revolving a pipe, means for forming a bearing-surface or flange on the end of the pipe comprising a longitudinally-movable carrier having a laterally-adjustable support, a longitudinally-adjustable slide thereon provided with a roll located in front of the end of the pipe, and a support laterally adjustable on said carrier, provided with a roll, located at the rear of the end of the pipe, and means for adjusting one of said rolls independently of the other, substantially as described.

In testimony whereof I affix my signature in presence of two witnesses.

JOSEPH K. SMITH.

Witnesses:
MILDRED E. McGREGOR,
W. G. DOOLITTLE.